R. H. PARKER.
DIRECTION INDICATING APPARATUS FOR VEHICLES.
APPLICATION FILED OCT. 1, 1915.
1,266,526.
Patented May 14, 1918
2 SHEETS—SHEET 2.
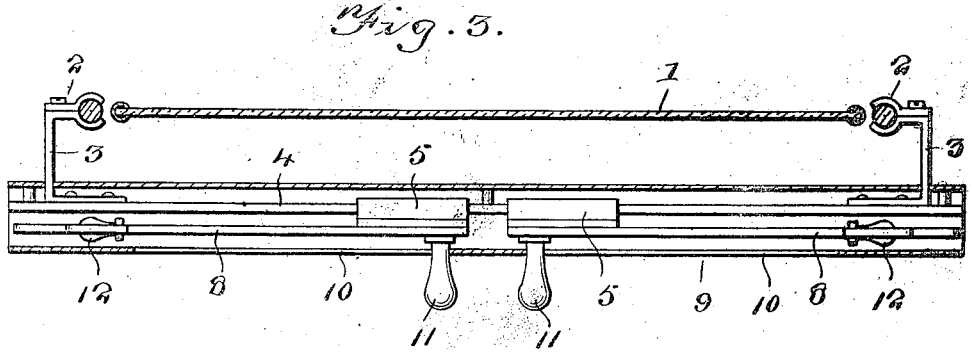
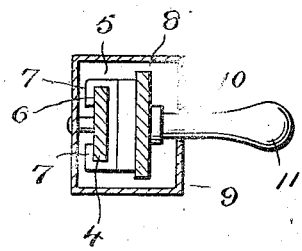 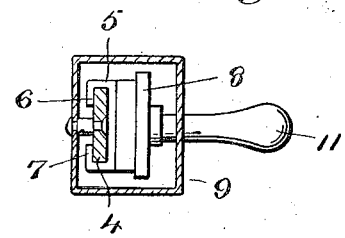
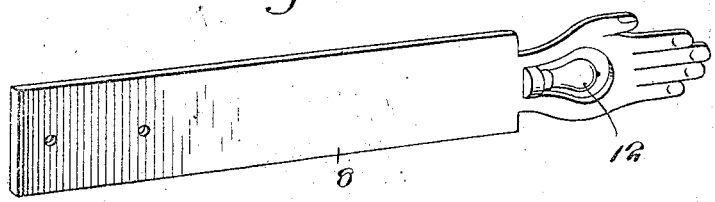
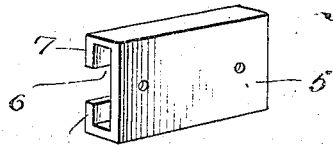
Inventor
R. H. Parker
Witnesses
By Victor J. Evans
Attorney

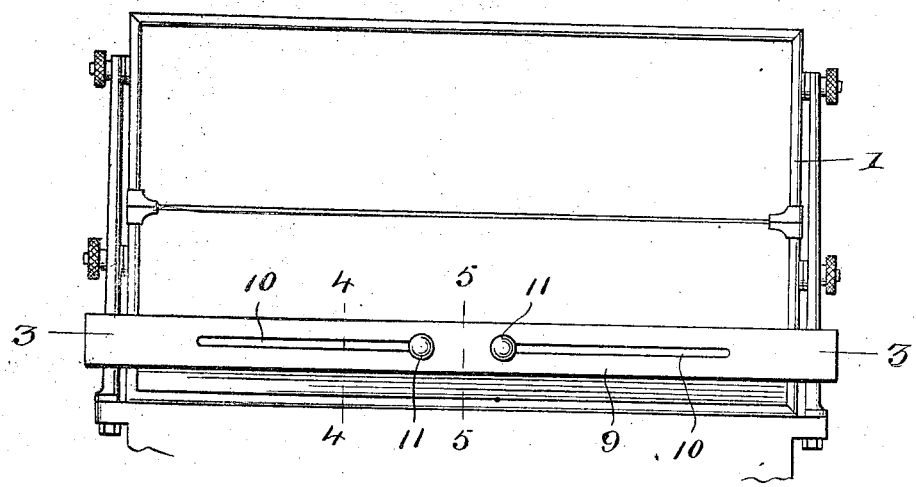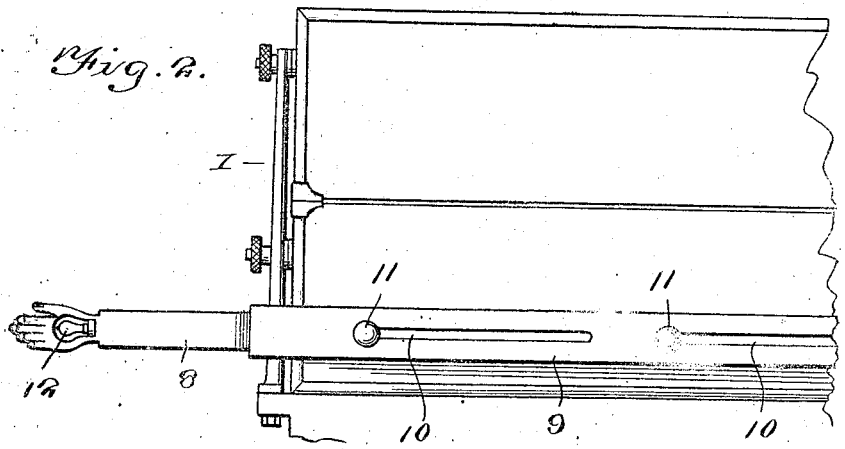

UNITED STATES PATENT OFFICE.

RYLAND H. PARKER, OF O'NEILL, NEBRASKA.

DIRECTION-INDICATING APPARATUS FOR VEHICLES.

1,266,526.     Specification of Letters Patent.     Patented May 14, 1918.

Application filed October 1, 1915. Serial No. 53,630.

*To all whom it may concern:*

Be it known that I, RYLAND H. PARKER, a citizen of the United States, residing at O'Neill, in the county of Holt and State of Nebraska, have invented new and useful Improvements in Direction-Indicating Apparatus for Vehicles, of which the following is a specification.

This invention relates to improvements in direction indicating apparatus for vehicles and has particular application to hand controlled apparatus of this type.

In carrying out the present invention, it is my purpose to improve and simplify the general construction of direction indicating apparatus for motor vehicles and to provide apparatus of the class described which may be operated quickly and conveniently by the driver of the vehicle to indicate the direction in which he is about to steer his vehicle.

With the above and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or principle or sacrificing any of the advantages of the invention.

In the accompanying drawings;

Figure 1 is a view in elevation of the wind shield, showing my direction indicating apparatus applied thereto.

Fig. 2 is a fragmentary view showing the wind shield in elevation and the direction indicating apparatus applied thereto and in signaling position.

Fig. 3 is a cross sectional view on the line 3—3 of Fig. 1.

Fig. 4 is a sectional view on the line 4—4 of Fig. 1.

Fig. 5 is a similar view on the line 5—5 of Fig. 1.

Fig. 6 is a perspective view of one of the signaling arms.

Fig. 7 is a similar view of one of the details of the invention.

In the present instance, I have shown my invention as applied to the wind shield of a motor vehicle.

Referring now to the drawings in detail, 1 designates a wind shield of any suitable or preferred construction. Secured to the opposite side bars of the wind shield 1 are clamps 2 of any suitable or preferred construction including inwardly projecting arms 3 arranged beyond the respective side bars of the frame. 4 designates a horizontal guide bar fastened to the inner extremities of the arms 3 and supported thereby and disposed at the rear of the wind shield. 5, 5 designate blocks each having one side formed with a longitudinal groove 6 and with flanges 7 overlying the groove. These blocks are slidably mounted upon the bar 4 and the grooves 6 receive the bar, while the flanges 7 overlie the bar to hold the blocks thereon. Fastened to each block in some suitable manner is an indicating hand 8 and the hands 8 project toward the opposite sides of the wind shield and when the blocks are slid along the bar in one direction the hands are projected beyond the wind shield, while when the direction of movement of the blocks is reversed, the hands are drawn toward each other within the confines of the wind shield. In the present instance, a casing 9 surrounds the bar and the blocks carrying the hands and the rear wall of the casing is formed with longitudinal slots 10 and projecting through the slots 10 are operating knobs 11 carried by the blocks 5 respectively whereby such blocks may be moved longitudinally upon the bar to project and retract the hands. If desired, each hand may be equipped with an electric lamp 12 connected in circuit with a suitable source of electrical energy whereby such lamps may be energized whenever desired.

In practice, when the operator of the vehicle is about to turn his vehicle in one direction, the corresponding hand is projected outwardly beyond the adjacent side of the wind shield so that drivers of other vehicles and pedestrians will be advised of the intention of the driver of the particular vehicle equipped with the direction indicating apparatus.

It will be seen that I have provided direction indicating apparatus for motor vehicles which may be conveniently operated, which embodies few parts and which may be quickly applied to the vehicle.

I claim:

A device of the character described comprising in combination with the windshield frame of a motor vehicle, a horizontally disposed casing arranged transversely of the windshield and provided in its front face with slots in end to end alinement, a guide rod secured within and extending longitudinally of said casing, angular brackets secured to said guide rod and extending through the rear wall of said casing for engagement with said windshield frame, blocks within said casing and slidable on said rod, a handle on each block extending through one of said slots, and an arm secured upon each block and adapted to be extended beyond the adjacent end of the casing when the associated block is moved.

In testimony whereof I affix my signature in presence of two witnesses.

RYLAND H. PARKER.

Witnesses:
W. B. JULIAN,
E. O. MILLER.